No. 838,736. PATENTED DEC. 18, 1906.
A. T. MOORE.
SHAFT SUPPORT.
APPLICATION FILED APR. 9, 1906.
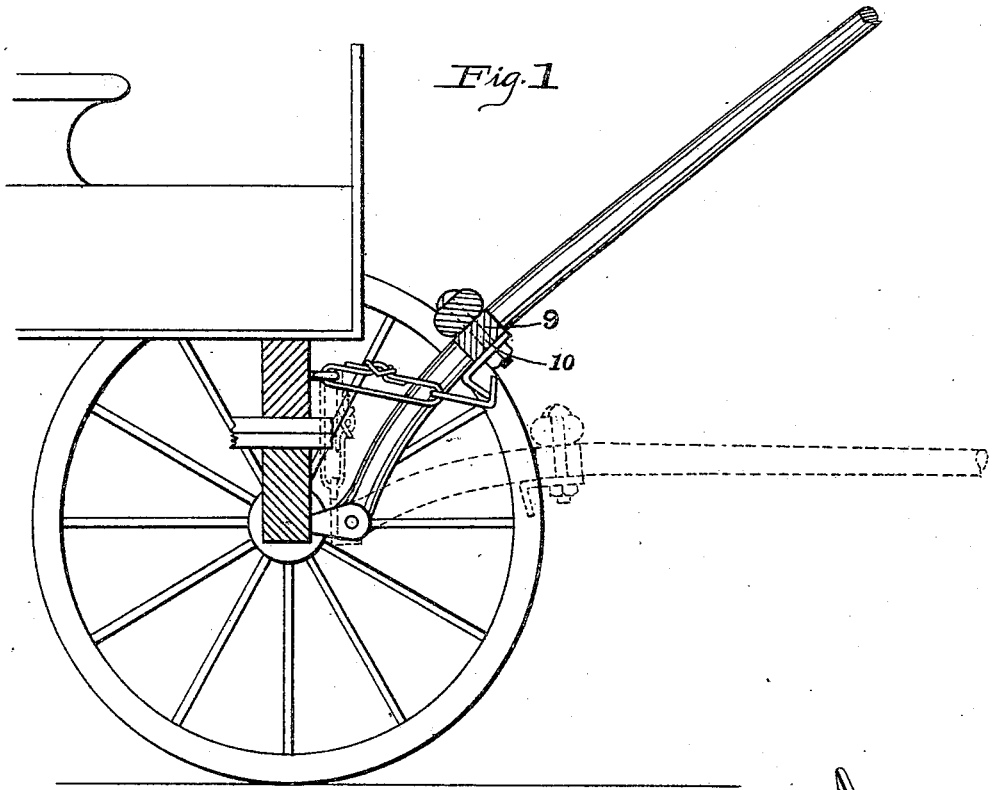
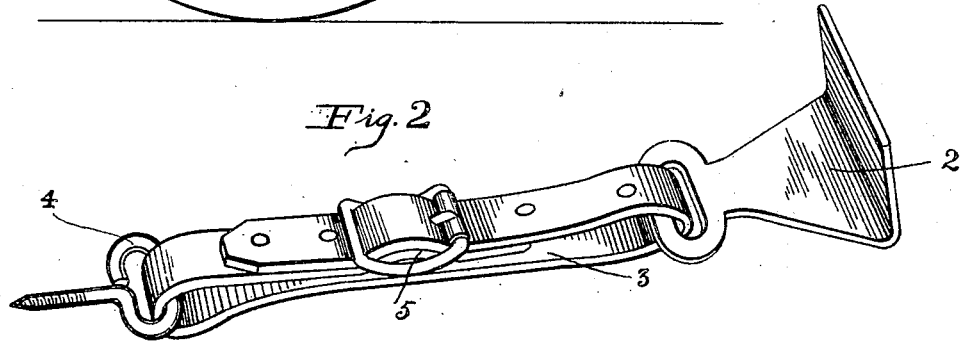
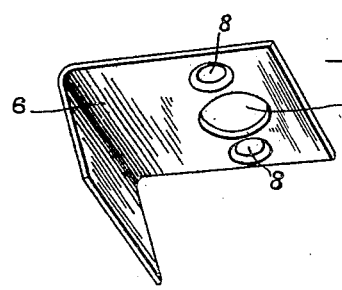
Witnesses
R. S. Johnson
C. H. Griesbauer
Inventor
A. T. Moore,
by H. B. Willson & Co
Attorneys

UNITED STATES PATENT OFFICE.

ALLEN T. MOORE, OF EMINENCE, KENTUCKY.

SHAFT-SUPPORT.

No. 838,736.   Specification of Letters Patent.   Patented Dec. 18, 1906.

Application filed April 9, 1906. Serial No. 310,848.

*To all whom it may concern:*

Be it known that I, ALLEN T. MOORE, a citizen of the United States, residing at Eminence, in the county of Henry and State of Kentucky, have invented certain new and useful Improvements in Shaft-Supports; and I do declare the following to be a full, clear, and exact description of the invention, such as will enable others skilled in the art to which it appertains to make and use the same.

This invention relates to improvements in shaft-supports.

The object of the invention is to provide a shaft-support by means of which the shaft or pole of a vehicle may be held in an elevated position and whereby upon a slight upward movement of the shaft or pole the supporting device will become released, thus permitting the shafts to be lowered.

A further object is to provide a support of this character which will be simple, strong, durable, and inexpensive in construction, efficient and reliable in operation, and which may be quickly applied to any style of vehicle.

With the above and other objects in view the invention consists of certain novel features of construction, combination, and arrangement of parts, as will be hereinafter described and claimed.

In the accompanying drawings, Figure 1 is a sectional view through the front end of a vehicle and the shafts, showing the invention applied thereto and supporting the thills in raised position, the vehicle member of the support being shown in dotted lines in a released or inoperative position. Fig. 2 is a perspective view of the vehicle member of the support, and Fig. 3 is a similar view of the thill member of the same.

Referring more particularly to the drawings, 1 denotes the vehicle member of the support, said member consisting of a flat hook 2, having formed on its upper end an elongated eye, with which is adapted to be engaged a strap-loop 3. Said loop also passes through a screw-eye or eyebolt 4, secured to a suitable part of the front end of the vehicle. The strap-loop 3 is provided with a buckle-connection 5, by means of which said loop may be lengthened or shortened to accommodate different styles of vehicles.

The shaft member of the support consists of a flat metal hook 6, which is provided with a centrally-disposed bolt-hole 7 and screw-holes 8. The hook 6 is adapted to be applied to the cross-bar 9 at the inner ends of the shafts and may be held in place on the under side of said cross-bar either by means of the whiffletree-bolt 10, which is adapted to be passed through the bolt-hole 7 in the plate, or, if desired, the plate may be secured to said cross-bar at any suitable point by means of screws which are passed through the screw-holes 8 and into said cross-bar, thereby permitting the support to be applied to any desired part of the vehicle and shafts.

In using the support the shafts are raised and the hook on the vehicle member of the support is engaged with the hook on the shaft member, thereby holding the shafts in an elevated position.

It will be observed by reference to Fig. 1 that the hook 2 does not interlink with the hook 6, but that it merely bears or impinges against it, so that the two are held confined by frictional contact, the force of which is directly proportioned to the weight of the thills. By this arrangement there would be no danger of the two hooks catching or failing automatically to separate when it is desired to lower the shafts, as they are simply given a slight upward movement which will cause the flexible connection of the vehicle member to allow the hook thereon to disengage itself from the hook on the shafts, thereby releasing the latter, as will be understood.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A shaft-support comprising a flexible member, means carried by one end to secure it to a vehicle, a hook carried by the other end and having its bill disposed approximately at right angles to its shank, and a second hook secured to the thills and having its bill disposed substantially at right angles to its shank, the two hooks being held in engagement solely by frictional contact with each other when the thills are raised, substantially as described.

2. A shaft-support comprising a flexible longitudinally-adjustable member, means carried by one end to secure it to a vehicle, a hook carried by the other end and having its bill disposed approximately at right angles to its shank and a second hook secured to the thills and having its bill disposed substantially at right angles to its shank, the two hooks being held in engagement solely by frictional contact with each other when the thills are raised, substantially as described.

In testimony whereof I have hereunto set my hand in presence of two subscribing witnesses.

ALLEN T. MOORE.

Witnesses:
H. C. DALE,
W. T. GIVIDEN.